Patented June 14, 1932

1,863,540

UNITED STATES PATENT OFFICE

IRA A. HURST, OF SCHENECTADY, NEW YORK, ASSIGNOR TO GENERAL ELECTRIC COMPANY, A CORPORATION OF NEW YORK

MOLDABLE COMPOSITION AND MOLDED PRODUCT OBTAINED THEREFROM

No Drawing.     Application filed December 24, 1930. Serial No. 504,642.

The present invention relates to moldable compositions and molded products obtained therefrom.

Ordinary molding compositions made from synthetic resins, for example, resins of the phenol-aldehyde type, require usually from 45 to 55% of resin in the composition in order to obtain the requisite flow, moldability, finish, etc. The remainder of the composition is usually a filler, such as wood flour, a plasticizing agent and a hardener. In such compositions the principal cost item is the synthetic resin and many attempts have been made to find means whereby the resin content in the composition may be reduced and at the same time produce a moldable composition which will have the requisite properties for commercial hot molding work.

Investigations have shown that the function of the resin in the ordinary molding composition is two-fold:

(1) To bind the filler particles together into a homogeneous mass and fill such voids as required by the natural packing of the filler under pressure, and (2) To saturate the filler.

Where such fillers as wood flour, cotton flock, asbestos fillers, etc. are employed, there is an appreciable quantity of resin used in saturating the filler.

I have discovered that if a suitable non-saturating filler is employed in conjunction with a moldable resin the resulting composition is moldable with a comparatively small resin content, and yields molded products of good mechanical and dielectric properties, and fine finish. In accordance with my invention all that is necessary is a simple compounding of the filler and the resin to produce a satisfactory and relatively cheap moldable composition.

In carrying my invention into practice I have found that seed hulls, for example cotton-seed hulls and specifically the waste, ground, extracted cotton-seed hulls obtained after the extraction of the cotton-seed oil, have the property of not only acting as filler in moldable compositions but are also non-saturating in nature and permit of the reduction of the resin content without injury to the flow, moldability, etc., of the composition, at the same time producing finished products of good mechanical and dielectric properties and fine finish at a relatively low cost.

In order that my invention may be better understood the following illustrative example is given:

| | Parts by weight |
|---|---|
| Cotton-seed hulls | 78 |
| Phenol molding resin | 20 |
| Spirit black dye | 2 |

These ingredients are mixed together in any suitable manner, for example by running on differential rolls, such as are employed in the rubber industry, after which the composition is ground, sifted and is ready to mold. The composition may be molded as a powder, or may be preformed into pills before molding, in a manner well known in the art. The composition molds easily and quickly takes the shape of the mold and yields finished pieces of fine appearance. While it is not necessary to restrict the molding conditions to the following, I have found satisfactory a pressure of about 800 pounds per square inch and a temperature of about 150° C., and a time of about 5 to 10 minutes varying with the size, shape, etc. of the piece.

The above example gives a composition which molds with fairly good flow. If the composition is changed by increasing the resin content to, for example, 30 parts by weight and at the same time decreasing the amount of seed-hull to 68 parts by weight a moldable composition with very good flow is obtained.

The mechanical strength of the finished product may be materially increased by substituting for part of the seed-hulls a filler such as wood flour, cotton flock or sawdust. A typical example of such a composition is

| | Parts by weight |
|---|---|
| Cotton-seed hulls | 58 |
| Sawdust | 20 |
| Phenol resin | 20 |
| Color | 2 |

The use of seed-hulls permits the employment of the low quantity of resin. This action appears to be due to the hard surface which this form of cellulose has which apparently gives it the property of non-absorbency.

It is to be understood that the resin which may be employed in conjunction with the seed hulls is not limited to phenol-aldehyde resins. Any suitable molding resin, such as resins of the phenol-furfural, urea-aldehyde type and the like may be employed. The usual plasticizers employed in molding compositions such as dibutyl phthalate, furfural, etc. may be employed to assist in bringing up the flow of the composition. Various colors, dyes, pigments and the like may likewise be employed to give suitably colored products.

What I claim as new and desire to secure by Letters Patent of the United States, is,—

1. A composition hot moldable to an infusible product comprising cotton-seed hulls and heat convertible synthetic resin, the proportion of resin in the composition being not more than approximately 30% by weight.

2. A composition comprising ground, extracted cotton-seed hulls intimately mixed and coated with approximately 20 to 30% by weight of a heat convertible synthetic resin said composition being hot moldable to an infusible state.

3. An infusible hot molded product comprising cotton-seed hulls molded under heat and pressure in the presence of approximately 20 to 30% by weight of heat convertible hot moldable synthetic resin.

In witness whereof, I have hereunto set my hand this 23d day of December, 1930.

IRA A. HURST.